United States Patent [19]
Bouteille et al.

[11] 4,415,004
[45] Nov. 15, 1983

[54] PNEUMATIC SWITCH

[75] Inventors: Daniel Bouteille; Michel Nicholas; Eric Petrimaux; Pierre Prudhomme, all of Nanterre, France

[73] Assignee: La Telemecanique Electrique, France

[21] Appl. No.: 211,964

[22] Filed: Dec. 1, 1980

[30] Foreign Application Priority Data

Nov. 30, 1979 [FR] France .................... 79 29820

[51] Int. Cl.³ .................................. F15B 13/07
[52] U.S. Cl. ...................... 137/884; 137/624.14; 137/885
[58] Field of Search ............ 137/624.14, 884, 885

[56] References Cited
U.S. PATENT DOCUMENTS 3,875,959  4/1975  Bouteille .............. 137/624.14 X
4,224,957  9/1980  Darves et al. ............ 137/884 X
4,245,673  1/1981  Bouteille et al. ........... 137/885 X

FOREIGN PATENT DOCUMENTS 2302433  9/1976  France .................... 137/884

Primary Examiner—Gerald A. Michalsky
Attorney, Agent, or Firm—William A. Drucker

[57] ABSTRACT

A switch provides for cutting the pressure feed for distributors placed downstream of it, and for coupling the feed of these distributors to an exhaust of the switch itself, and has faces for connection with faces of the distributors, channels for circulation of exhaust fluid, members for connection with adjacent distributors, and is adapted for mounting on a conventional profiled element. The switch is particularly advantageous for ensuring the control of the feed of one or of several jacks coupled to distributors.

8 Claims, 7 Drawing Figures

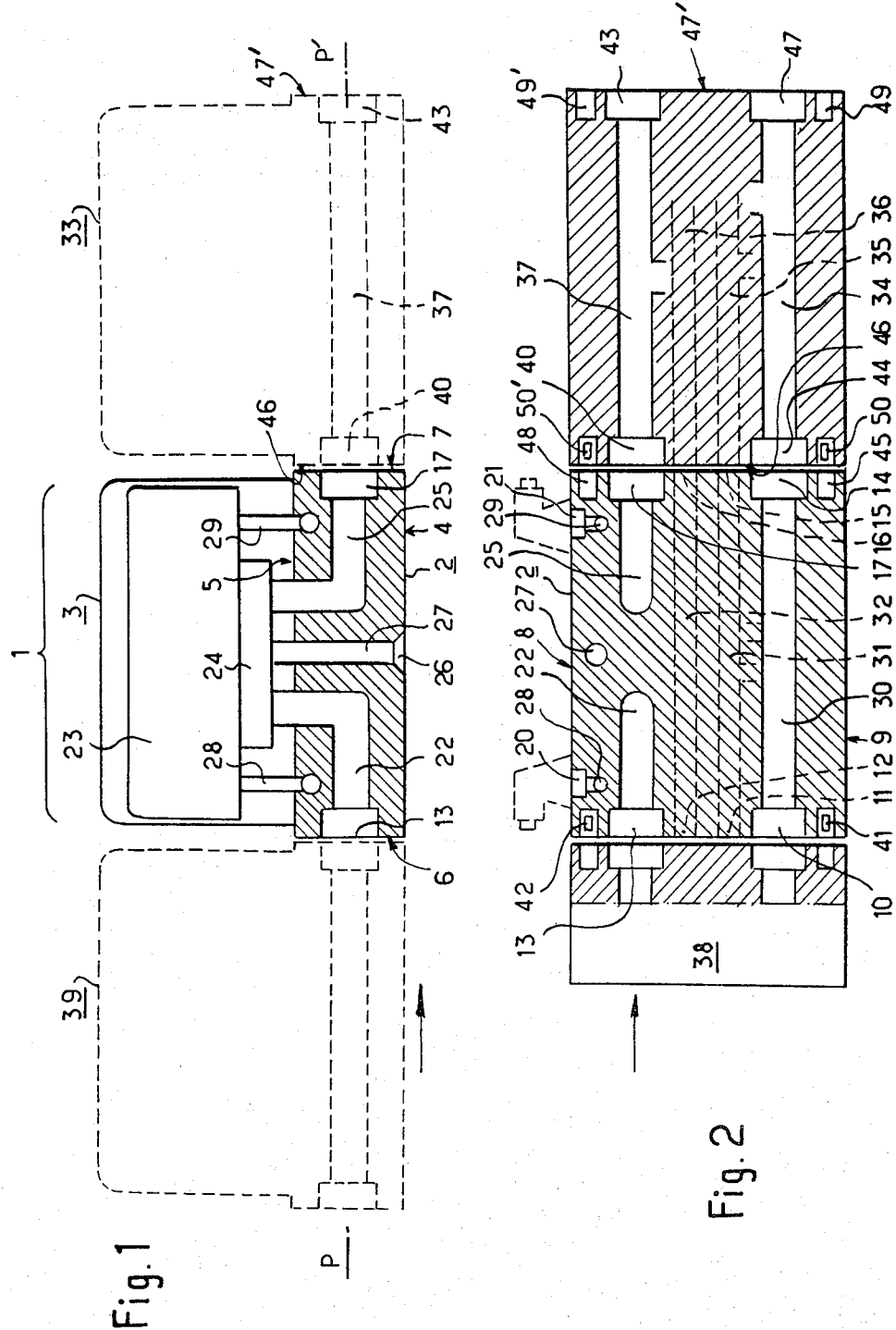

PNEUMATIC SWITCH

BACKGROUND OF THE INVENTION

The invention relates to a pneumatic switching means having a body which comprises:

an entry and an exit for fluid under pressure, a distributing means adapted to couple this outlet either to said entry or to an exhaust, as a function of the absence or the presence of a control signal applied to a control inlet of the distributing member, the outlet for fluid under pressure being in communication with a feed entry of a distributor coupled to at least one jack.

PRIOR ART

The known apparatuses corresponding to the construction referred to above are generally intended to control the arrival of fluid under pressure which feeds one or a group of pneumatic distributors, these latter being most often constituted by several apparatuses mounted side by side and each fed through a branch of a principal fluid pressure conduit.

It has therefore been proposed:

(i) that each distributor shall be provided with a respective feed entry for fluid under pressure coupled to a principal conduit, this solution necessitating a large cost of material both in conduit and in connections;

(ii) that this principal conduit and its particular branches shall be formed at the interior of a single base on which will be secured several distributors according to another known construction; or (iii) that this principal conduit shall be formed by the association of successive lengths of principal conduit each appertaining to a distributor also comprising its own branch in conformity with another prior art construction.

Numerous inconveniences appear when, for example, after putting into use, it is found to be useful to be able to block a proportion of the jacks of this installation, or it is felt to be necessary to prevent the operation of certain jacks for reasons of safety; in effect, in the first case, the base can generally not be subjected to any modification, and in the second case, in particular if the switching means must only relate to a part of the associated distributors, it is necessary to separate the distributors by a large spacing to provide access to the feed entries, most often placed at the rear in this type of apparatus, and to cut the principal conduit for coupling a switching means externally to the ends of the conduit which have just been separated; furthermore, it becomes necessary to put into place beween the groups of distributors, disposed upstream and downstream of the switching means, another section of channel serving to permit flow again of the exhausts, if such a measure falls within the bounds of the installation charges.

OBJECT OF THE INVENTION

The invention accordingly proposes to provide a switching means capable of being connected in simple manner either directly at the head of a line of distributors of known kind, or between them, the latter being in this case placed upstream and downstream of it, in such a manner that this connection does not have any of the inconveniences mentioned above in relation to the known apparatuses and systems.

SUMMARY OF THE INVENTION

According to the invention, this result is obtained in that, in known manner, the distributor coupled to the jack comprises a first and a second opposed parallel faces, in the vicinity of which are disposed first and second coupling means, and respectively two parallel channels each of which has a first orifice on the first face and respectively a second orifice on the second face, passing through the said distributor to ensure the circulation of a fliud under pressure, and respectively the circulation of an exhaust fluid, the first orifice of the pressure fluid circulation channel constituting the said feed entry, that the switching means comprises a body having a first and a second opposed parallel faces on which are disposed the said entry and the said outlet of fluid under pressure respectively, that a channel for circulation of exhaust fluid disposed in this body opens on the first and on the second face of the body through a first orifice and through a second exhaust orifice respectively, that coupling means adapted to cooperate respectively with the first and second coupling means of the distributor coupled to the jack are disposed in the vicinity respectively of the first and second faces of the body of the switching means, such that when the first or second face of a distributor is placed against respectively the second face or the first face of the body of the switching means, and these faces are applied one against the other by coupling means, the respective entry and outlet orifices of the switching means are coupled respectively to the second and to the first orifice of the pressure fluid circulation channel of the distributor, whilst the second and first orifices of the exhaust fluid circulation channel of the distributor are coupled to the exhaust channel of the switching means.

Other features and advantages of the invention will appear more clearly with the aid of the following description.

BRIEF DESCRIPTION OF THE DRAWINGS

In the attached drawings:

FIG. 1 is a schematical longitudinal section of a switching means in accordance with the invention;

FIG. 2 is a schematic view of the internal construction of a switching means, according to FIG. 1, seen in section taken on a perpendicular plane passing through the plane PP';

DESCRIPTION OF THE PREFERRED EMBODIMENT

Figure 3:
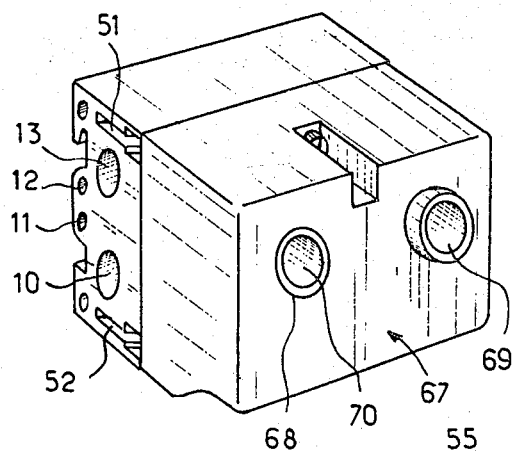
FIG. 3 is a perspective view of a switching means viewed from one side and its front face.

A pneumatic switching means 1 in accordance with the invention is composed of a base 2 intended to be secured on a support, described later herein, assembled to a removable housing 3 (see FIGS. 1 and 2); this division into two elements is however only shown by way of non-limiting example, an undivided body being likewise proposed.

The base 2 has a first face 4 intended for its mounting, a second face 5 opposite to the first and intended to receive the housing 3, a third face 6 and a fourth face 7 opposite to and parallel to the third, and finally a fifth face 8 and a sixth face 9.

Figure 4:
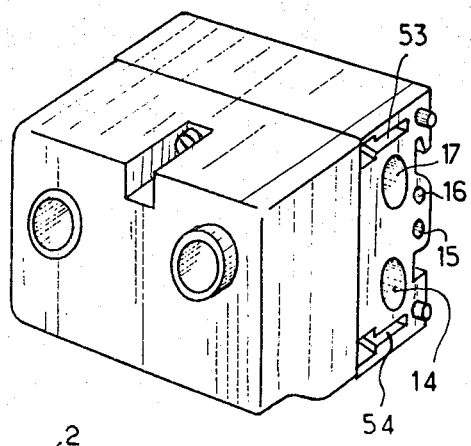
FIG. 4 is a perspective view of the same switching means viewed in perspective from a second side, opposite to the first, and its front face.
Figure 5:
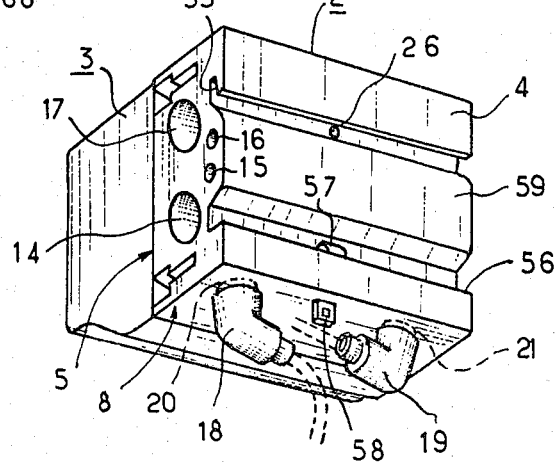
FIG. 5 is a perspective view of a switching means viewed on its rear face.

The third and fourth faces, which are advantageously perpendicular to the first face, comprise a first series of orifices 10, 11, 12, 13 visible in FIG. 3, and respectively a second series of orifices 14, 15, 16, 17 visible in FIG. 4, whilst the fifth face 8 receives connectors 18, 19, preferably orientatable, which are engaged in orifices 20, 21 of said face, see also FIG. 5.

In this same FIG., it will also be seen that an orifice 26 opens at the first face 4.

Referring to FIGS. 1 and 2, wherein the internal construction of the switching means is shown schematically, it will be seen that the orifice 13 constitutes the entrance of a channel 22 terminating at a slide 24 which can be displaced by a switching member 23, that the orifice 17 constitutes the exit of a channel 25 terminating at the said slide, and that the orifice 26 constitutes an exhaust particular to a channel 27 terminating at the slide, the elements 23 and 24 representing a distributing means.

Furthermore, two channels 28 and 29 respectively couple the orifices 20 and 21, and thus the connectors 18 and 19, to the switching member receiving the control signals.

The entry 13 is fed with a fluid under pressure, and the outlet 17 delivers or does not deliver fluid under pressure according to whether the slide is in one of two states, flowing or blocking, which it can assume when the switching member is displaced by a control fluid applied at one of the two connectors; in the flowing state, the outlet 17 is thus coupled to the entry 13, whilst in the blocking state the outlet 17 is coupled to the channel 27 and to the respective exhaust outlet 26.

This switching member and this slide in fact represent a known distributing means the construction of which is not the object of the invention, and which could be replaced by another switching device having the same function.

The orifices 10 and 14 are coupled by an exhaust fluid channel 30 which passes through the base, whilst the orifices 11, 15 and 12, 16 are respectively coupled by a first and a second auxiliary channel 31 and 32, see FIG. 2.

This switching means is intended to control the passage of a fluid under pressure, present at its entry, to a distributor, such as 33, placed against it and downstream, itself comprising a channel 37 for feed of fluid under pressure in communication with the orifice 17, a channel 34 for exhaust fluid in communication with the orifice 14, and two auxiliary channels 35, 36 coupled to the orifices 15 and 16; this distributor 33, placed downstream, can itself be the first distributor of a group of distributors identical to the first which would be coupled amongst themselves in such a manner that their channels of like function would be coupled to each other.

Furthermore, the path of arrival of fluid under pressure for the entry 13 and the various connections which have to terminate at the orifices 10, 11, 12 can be provided either by a coupling block 38, see FIG. 2, placed upstream against the face 6, or again by a distributor such as 39 identical to the first distributor 33, see FIG. 1.

The switching means can thus be placed either solely upstream of a particular distributor or of a group of distributors, or between two groups of distributors disposed respectively upstream and downstream, the circulation of fluid under pressure occurring from upstream towards downstream; as these distributors are associated with jacks, their control will thus depend upon the state of the switching means disposed upstream.

The association of the switching means with distributors placed upstream and downstream against its third face 6 and respectively against its fourth face 7 thus requires that, on the one hand, the associated distributors shall each be provided with a first joining face 46 and a second joining face 47' each comprising at least first orifices 40, 43 and at least second orifices 44, 47 representing the ends of a channel 37 for circulation of fluid under pressure, and respectively the ends of a channel 34 for circulation of exhaust fluid, and on the other hand that coupling means shall be provided for coupling the switching means mechanically to one or several distributors, see FIG. 2.

The switching means thus comprises first and second coupling means 41, 42 and 45, 48 respectively which are adapted to cooperate with second coupling means 49, 49' and first coupling means 50, 50' respectively, carried by a distributor; these first and second means are disposed, both for the distributors and for the switching means, in the vicinity of first and second faces 46,47' respectively in the vicinity of the third and fourth faces 6, 7.

Preferably, these means will make use of screws adapted to be placed in recesses 51, 52, 53, 54 terminating at these faces 6, 7, see likewise FIGS. 3 and 4.

Figure 7:
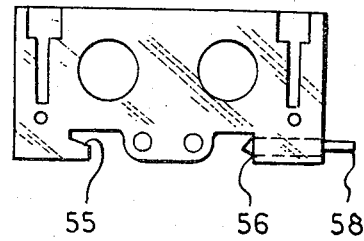

In FIG. 5 it will be seen that the first face 4 comprises on the one hand a longitudinal rib 55 disposed parallel to the general direction of the channels terminating at the orifices 14, 15, 16, and a longitudinal edge 56 parallel to the rib and directed towards it. This edge comprises a securing catch 57 which is returned resiliently towards the rib and has an external manipulating tail portion 58 permitting its actuation in reverse direction for carrying out unlocking, see also FIG. 7.

Between the edge and the rib there is disposed a longitudinal boss 59 which contains the auxiliary channels terminating at the orifices 15, 16. The special exhaust orifice 26 can terminate in open air between the boss and the said rib, or between the boss and the said edge.

Figure 6:
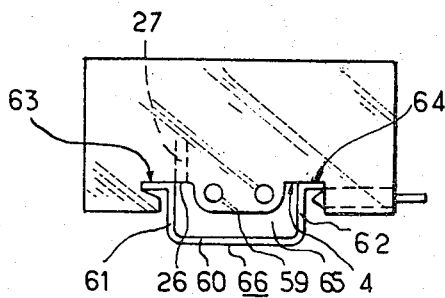
FIGS. 6 and 7 are respectively a side view of a part of a switching means, without and with its mounting profiled element.

As is visible in FIG. 6, the switching means can be secured on a conventional profiled element 66, a so-called "hat" profile, of a base 60 having two parallel arms 61, 62 and two wings 63, 64 bent up at the ends of the arms so as to be in the same plane. The external edges of these wings cooperate with the rib and catch respectively when the switching means is mounted on the profiled element, to be secured there in removable manner.

It will be seen that when the mounting is carried out, a relatively large section 65 is placed between the first face 4 of the switching means and the internal surfaces of the profiled element.

When distributors provided with comparable mounting means are associated with the switching means on the same "hat" profiled element, a channel of length equal to that of the profiled element and of cross-section equal to that of the section 65 is formed between the profiled element and the apparatuses which it receives on it.

As a result, the special exhaust orifice 26, or the special exhaust orifices if several switching means are placed between the distributors, are thus aligned by means of the profiled element. This arrangement has numerous advantages for avoiding pollution of other apparatuses disposed in the vicinity by water of condensation, or by grease, from the exhaust; this advantage is still further appreciable when the pneumatic equipment makes use of electrical circuits or apparatus, for example for the excitation of electro-valves, because the evacuation of polluting products will occur essentially at the end of the profiled elements.

When such a switching means is disposed upstream of a distributor coupled to a jack, or of a group of distributors each coupled to a particular jack, it is possible to control the feed of fluid to these distributors, and thus to the jacks.

Such a control is found to be justified when, for reasons of security or of adjustment, it is necessary to deprive a certain number of jacks of their pressure feed, without also having to change the state of the distributors to which they are coupled. The inclusion of a switching means in accordance with the invention can be easily carried out by reason of the mechanical coupling means and by reason of the respective fluid circulation channels which they possess, without necessitating the use of supplementary conduits.

Furthermore, the presence of a special exhaust 26, to which will be coupled the feed entry of the distributors so as to inhibit their action, permits the carrying out of a rapid purging of the pressure channel situated downstream, and thus ensures an instantaneous halting of the movement of the jacks.

The control of change of state of the switching means will most often be provided by pneumatic signals transmitted in flexible conduits coupled to the connectors 18, 19. However, see FIG. 3, a control by manual actuation or by electrical means can be carried out at any time, by reason of the presence on the face 67 of the switching means of a threaded opening 68 adapted to receive a removable push button such as 69, or the movable armature of a removable electro-magnet; the movements of this push button or of this armature will cause the appearance of a pressure in one of the channels 28 or 29 by acting on an appropriate pilot element. A stopper 70 will be used to close the opening 68 if a manual or electrical control is not necessary.

The existence in the body of the switching means of two auxiliary channels mentioned above is justified in the case where the channel for the exhaust fluids of the switching means through the internal volume of the profiled element would not provide entire satisfaction; in this case, the channel 27 mentioned above would be coupled for example to the first auxiliary channel 31 which would thus become a secondary exhaust fluid channel; this channel, which is extended upstream and downstream by corresponding channels such as 35 of the distributors, could also collect the exhausts of internal members of the distributors which could not, for technical reasons, be passed through the channels 34 and 30.

Nevertheless, if the pressures developed in the exhaust fluid circulation channel at the instant when the distributors are coupled to it are low, and if the cross-section of this channel is sufficient, it would be possible to connect the channel 27 to the channel 30 in an internal manner.

The second auxiliary channel can advantageously ensure the circulation of a secondary fluid under pressure intended for example for the feeding of other members disposed at the interior of the distributors, such as distribution pilots which cause the movements of a switching member.

We claim:

1. In the assembly of a switching unit (1) and a distributor unit (33), the distributor unit having a feed entry (40) and the switching unit having a body (2-3) which has first (4) and second (5) parallel faces and comprises:
   (i) an entry (13) and an outlet (17) for fluid under pressure, an exhaust (27) and a control entry (18 or 19); (ii) a distributing means (23) adapted to couple this outlet (17) selectively to said entry (13) and to said exhaust (27), as a function of the absence or the presence of a control signal applied to said control entry (18 or 19), the said outlet (17) for fluid under pressure being in communication with the said feed entry (40) of the distributor unit (33); the improvement which consists in that:
   (A) the distributor unit (33) has:
      (a) first (46) and second (47') opposed parallel faces and first (50-50') and second (49-49=) coupling means on the said first (46) and second (47') parallel faces;
      (b) at least first (37) and second (34) parallel channels each having a first orifice (40-44) on the first face (46) and a second orifice (43-47) on the second face (47'), said first and second channels passing through the said distributor unit, for circulation of a fluid under pressure and of an exhaust fluid respectively, the first orifice (40) of the first channel (37) constituting the said feed entry of the distributor unit;
   (B) the body of the switching unit (1) has third (6) and fourth (7) parallel and opposed faces which are substantially at right angles to the first (4) and second (5) parallel faces of the said body and on which are respectively disposed the said entry (13) and the said outlet for fluid under pressure (17) of the switching unit;
   (C) a channel (30) for circulation of an exhaust fluid disposed in said body opens on the third and on the fourth face of the body through respective first (10) and second (14) exhaust orifices;
   (D) further second coupling means (45-48) on the fourth face (7) of the said body, said further second coupling means being adapted to cooperate with the first coupling means (50-50') of the distributor unit when the first face of the distributor unit is placed against the fourth face of the said body, the said outlet (17) of the switching unit being then coupled to the said first orifice (40) of the first channel and the said second exhaust orifice (14) of the switching unit being coupled to the said first orifice (44) of the second channel of the distributor unit.

2. In the assembly of a switching unit (1) and a distributor unit (39), the distributor unit having an outlet for fluid under pressure, the switching unit having a body which has first and second parallel faces and comprises:
   (i) an entry and an outlet for fluid under pressure, an exhaust and a control entry;
   (ii) a distributing means adapted to couple this outlet selectively to said entry and to said exhaust as a function of the absence or the presence of a control signal applied to said control entry, the said inlet for fluid under pressure of the switching unit being in communication with the said oulet for fluid under pressure of the distributor unit; the improvement which consists in that:

(A) the distributor unit has:
 (a) first and second opposed parallel faces and first and second coupling means on the said first and second parallel faces;
 (b) at least first and second parallel channels, each having a first orifice on the first face and a second orifice on the second face, said first and second channels passing through the said distributor unit, for circulation of a fluid under pressure and of an exhaust fluid respectively, the second orifice of the first channel constituting the said outlet for fluid under pressure of the distributor unit;

(B) the body of the switching unit has third and fourth parallel and opposed faces which are substantially at right angles to the first and second parallel faces of the said body and on which are respectively disposed the said entry and the said outlet for fluid under pressure of the switching means;

(C) a channel for circulation of an exhaust fluid disposed in said body opens on the third and on the fourth face of the body through respective first and second exhaust orifices;

(D) further first coupling means on the third face of the said body, said further first coupling means being adapted to cooperate with the second coupling means of the distributor unit when the second face of the distributor unit is placed against the third face of the said body, the said inlet of the switching unit being then coupled to the said second orifice of the first channel and the said first exhaust orifice of the switching unit being coupled to the said second orifice of the exhaust second channel of the distributor unit.

3. An assembly according to claim 1 or 2, wherein a further orifice (26) is provided on the said first face (4) of the body and said exhaust (27) of the switching units opens directly to atmosphere through the said further orifice.

4. An assembly according to claim 1 or 2, wherein the said body of the switching unit comprises a first auxiliary channel (32), parallel to the said channel (30) for circulation of an exhaust fluid and opening at the said third and fourth faces, for circulation of a second fluid under pressure.

5. An assembly according to claim 4, wherein the said body of the switching unit further comprises a second auxiliary channel (31) parallel to the said first auxiliary channel (32) and opening at the said third and fourth faces, for circulation of a second exhaust fluid.

6. An assembly according to claim 1 or 2, wherein the said body of the switching unit is constituted by the assembly of: a first half-body (2) constituting a fixed base which is traversed by the said channels of the switching unit and which comprises the said entry, outlet, exhaust and the said first and second exhaust orifices; a second (3) removable half-body which comprises the distributing means (23), said first and second half-bodies being assembled along a surface parallel to the general direction of the said channels.

7. An assembly according to claim 1 or 2, wherein the said body of the switching unit has fifth (8) and sixth (9–67) faces which are parallel to the said channel (30) for circulation of an exhaust fluid, at least one control orifice (20–21) on said fifth face and a control opening (68) on said sixth face.

8. An assembly according to claims 1 or 2, further comprising a U-section-profiled element (66) having two opposed wings (63–64) wherein fixed latching means (55) and movable resilient latching means (57) respectively adapted to cooperate with the respective opposed wings of the said profiled element, are arranged on the first face of the said body.

* * * * *